Aug. 14, 1945.  R. F. WARREN, JR  2,382,355
LUMINOUS ROPE
Filed Sept. 3, 1942
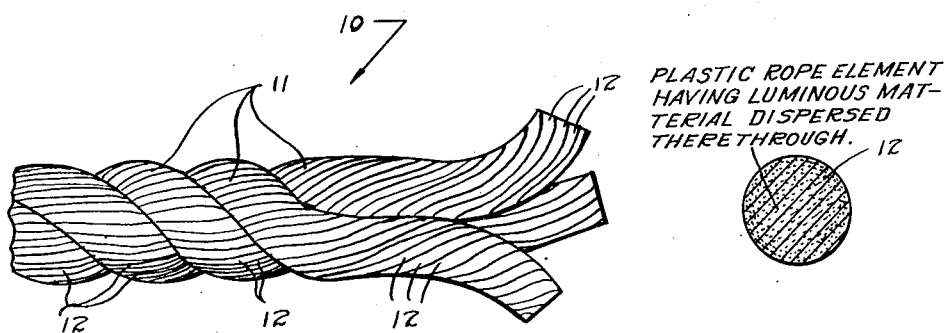
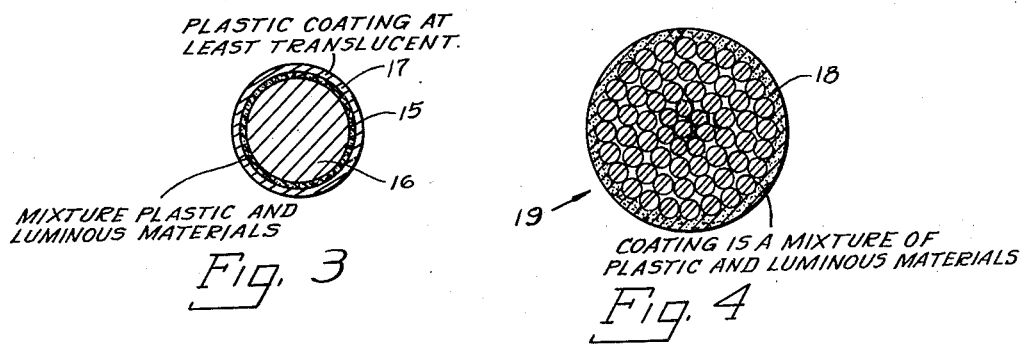
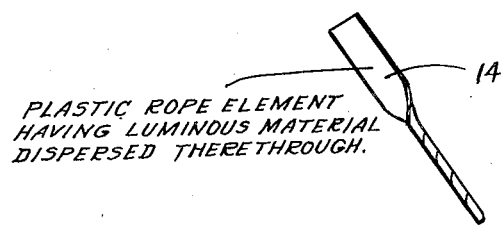
INVENTOR
RICHARD F. WARREN JR.
BY John F. Hanrahan
ATTORNEY Patented Aug. 14, 1945

2,382,355

UNITED STATES PATENT OFFICE 2,382,355

LUMINOUS ROPE

Richard F. Warren, Jr., Stratford, Conn.

Application September 3, 1942, Serial No. 457,207

2 Claims. (Cl. 28—81)

This invention relates to new and useful improvements in ropes and has particular relation to ropes having luminous properties whereby the ropes are more readily visible at night or in places lacking in illumination or in a visible light.

The objects and advantages of the invention will become apparent from a consideration of the following detailed description wherein satisfactory embodiments of the invention are disclosed. However, it is to be understood that the invention is not limited to the details disclosed but includes all such variations and modifications as fall within the spirit of the invention and the scope of the appended claims.

In the drawing:

Fig. 1 is a side elevational view of a short length of rope made in accordance with the invention;

Fig. 2 is a greatly enlarged transverse sectional view through one filament of the rope;

Fig. 3 is a similar view but showing a modification;

Fig. 4 is a sectional view through a rope showing another modification, and

Fig. 5 is a perspective view showing a further modification.

This application is a continuation-in-part of my application Serial Number 341,352 filed June 19, 1940.

According to the present invention a rope is made or treated to be more visible at night or when used in places lacking in illumination or in a visible light. The rope of the invention is particularly useful as a tow rope or as a life line or for use in highway fences or about excavations or the like. In one application of the invention the rope may be coated with a luminous material while in the preferred embodiment of the invention the luminous material is incorporated in the material from which the rope is made whereby to be protected against abrasion.

In my application above identified I have disclosed the making of ropes and rope elements, including cores, of plastic materials and preferably of synthetic plastic materials. Vinylidene chloride is an excellent plastic material for my purpose although it will be understood that other plastics may be used in the making of my rope. Particularly other vinyl and styrene compounds although it is to be understood that any of the various other plastics as synthetic resins, natural and synthetic lastics, cellulose (as ethyl cellulose) and its derivatives, protein plastic substances (as nylon) and petroleum plastic derivatives may be used.

There are several chemical types of synthetic resins such as (1) phenol-aldehyde resins, (2) amino-aldehydic resins, (3) hydroxy-carboxylic resins, (4) sulphonamide resins, (5) resins from sugar, (6) vinyl resins including resins from vinyl derivatives, (7) indene resins and (8) lignin plastic substances. Generally the clear or transparent resins such as the polymers of the esters of methacrylic acids as the polymethacrylic resins sold as Lucite and Plexiglas are preferred for my immediate purpose.

Under the type (1) may be included resins such as phenol formaldehyde, cresol, and cresylic acid, other tar acids and formaldehydes, phenol furfuraldehyde or other tar acids and other aldehydes. Under type (2) is included urea and formaldehyde resins, and analine resins obtained by condensing aniline and formaldehyde and other anilines or amines and other aldehydes.

Under type (3) I include materials produced by the esterification of polybasic acids with polyhydric alcohols. Such materials are frequently called alkyd resins, this title including adipic acids resins obtained by the condensation of adipic acid and glycerin or by the condensation of glycerin with phthalic anhydride. Type (4) includes the sulphonamide resins developed from para toluensulphonamide. The resins from sugar, type (5) above, are obtained by condensing saccharide with aldehydes and urea.

Vinylidene chloride (sold commercially as Venalloy) is included in the group of vinyl resins (type 6) including resins from vinyl derivatives and such group also comprehends vinyl ester, vinyl butyrate, vinyl chloride, acrylic resins from vinylcarbonic acid ester, vinyl carbonic acid, vinyl benzole or polystyrol, divinyl or butadiene, vinyl ester or vinyl chloride, copolymerized polyvinyl chloride and polyvinyl acetate (known commercially as Vinylite), vinyl acetate, polymers of vinyl halides combined with different percentages of plasticizers (known commercially as Koroseal) the commercial article known as Vistanex and comprising polyiso butylene polymerized with boron trifluoride and also comprising polyiso butadiene having a tacky to rubber-like structure, the commercial products known as Vinyon (a copolymer of polyvinyl chloride and polyvinyl acetate), Butacite (a reaction product of vinyl acetate resin with butyraldehyde), and Rezel (resulting from the fact that the introduction of an unsaturated resinous ester of the maleate polyester type into a compound of the type (R—CH=CH$_2$) has the property of curing the latter), the polymer of ester of acrylic acid known commercially as Plexigum, polymers of the esters of methacrylic acids such as the polymethacrylic resin sold as Lucite and Plexiglas. Isobutyl methacrylic resins, certain plastic obtained by mixing the monomer of styrene with vinylidene chloride and with ethylene glycol and maleic acid and copylymerizing the mixture, styrene and in addition thereto the resin known as polystyrene.

Resins of the indene group (type 7) include poly-indene and poly-cumarone. Under type (8) I include lignin and its derivatives extracted from paper mill waste waters and other sources. The lignin may be separated into various chemical components of no value to me here but also into colored gums and by various treatments into clear transparent resins useful for my present purpose. Lignin is hydrogenated with Raney nickel catalyst, in aqueous solution yielding methanol, propylcyclohexane, hydroxy propylcyclohexanes, and a colorless resin which may again be separated into an alkali soluble in an alkali insoluble component. I use either of these components in the production of resins to be used in the making of ropes.

Under the heading of natural and synthetic lastics, I include as natural lastics—balata, rubber, gutta percha and latex to be used alone or as a coating or processed or compounded with other materials. As the synthetic lastics I mention polymerized chloroprene (of the type now sold as neoprene); polymerized butadiene (of the type sold as buna or Perbuna); polymethylene polysulphide (of the type sold as Thiokol); chlorinated rubber (of the type sold as Tornesit); rubber hydrochloride (of the type sold as Pliofilm); and isomerized rubber (of the type sold as Plioform) and any latex of these. Also sulphonated rubber or synthetic sulphonates to promote wire adhesion.

Certain materials sometimes called synthetic lastics I prefer to include under the heading of vinyl derivatives. For example, it appears that the polymerized vinyl derivative known commercially as Vistanex (polyiso butylene and polyiso butadiene) might be included under either group. Such material is used in the present instance when mixed with other materials and has certain lubricating properties of value in the making of ropes.

Under the heading of cellulose and its derivatives I include cellulose acetate; regerenated cellulose; cellulose xanthate; benzylcellulose; ethylcellulose; cellulose hydrate; cellulose triacetate; cellulose acetobutyrate; cellulose acetopropionate; hydrolysed cellulose acetate and others of the cellulose esters and ethers. Railan a rayon thread made from cellulose extracted from sugar cane may also be used. Most of these materials can be used alone for my purpose in the making of ropes and can be used in the form of filaments or may be cut to strips from sheets and then the strips twisted into filaments. Also certain of these materials may be used with other materials herein mentioned for the purpose of toughening the latter.

Nitrocellulose compounded with other materials of a less flammable nature or of a nature to prevent flammability, may be used. Halowax or the like may be used for compounding with nitrocellulose and it is noted that the latter is so far as cost, strength and the like are concerned, a desirable material for my purpose. Other noninflammable plasticizers which may be compounded with nitrocellulose for my purpose are monophenyl phosphate and di (paratertiary butyl phenyl) mono 15 tetiary butyl 2 xenyl phosphate. The flammable nature of nitrocellulose may be weakened or lessened by mixing with varying proportions of cellulose acetate. Under this class may also be included gel cellulose which may be used for my purpose. This material may be used as a filler with other materials herein mentioned.

Under the heading of protein plastic substances, I include casein preferably in the fibrous form sold as Lactofil and Lanital made by either the wet or dry process. The material sold as Zein, and which comprises a raw material in the form of a powder, may by extrusion or the like be converted into fibres for use here. Polypentamethylene sebacamide sold as nylon may also be used. Regenerated silk made by reducing waste silk and waste cocoons containing silk and then forming it into threads or sheets to be cut to strips, is also believed to fall under the present heading.

That group of compounds of which at least one is obtained by condensation polymerization from a diamine and a dibasic carboxylic acid and of which one is now sold under the trade-mark Exton is very useful for my present purpose.

Another protein plastic which may be used is obtained by extracting the protein from the refuse remaining after the oil has been extracted from soy beans, oiticica nuts, and other protein bearing substances. The extracted protein is properly reacted to form plastic substances. Here it is noted that oiticica oil may be used as a plasticizer with styrene to make the latter more suitable for my purpose.

Collagen plastics are another protein substance suitable for my purpose. Such plastics are fibrous. The collagen may be recovered from the waste from tanneries or otherwise. Various resins from coffee may also be used.

The petroleum plastic derivatives include those gums or resins obtained by the oxidation or controlled polymerization of certain distillates of petroleum cracking. Thus I may use the commercially known "Santoresins" produced by this method as well as "Petropol" which is a softer type of the same material. These materials are, when used for my purpose, to be mixed with other materials listed above whereby the resultant mass may be shaped by extruding or the like to provide threads or sheets of materials having desired characteristics. Propane precipitated resins from distillation of crude petroleum may also be used to advantage as an assistant to produce heat penetration to materials like vinylidene chloride and retain stability.

Also cracking coal tar resins of high aromatic content condensed with formaldehyde or other aldehydes forms resins useful for my purpose. Similarly, I may use heavier petroleum products cracked and then condensed with formaldehyde or other aldehydes, hydrogenated or chlorinated either at elevated temperatures or by the addition of metallic halides. For use as rope cores comprising large diameter bars and the like, the materials are advantageous. The natural inorganic materials above mentioned may be used in the place of the organic plastics in certain instances. The glass or the quartz must be made plastic by heat and then it is spun or extruded in fibres and the latter are brought together to form strands or cores as the case may be.

Plastics comprising nitrogenous condensation products are also suitable for use in the making of various rope elements of the invention. One such plastic is now on the market under the name "Nulamine."

Preferably when glass, fused quartz or other materials which may be made into fibres of great tensile strength are used as a material in the making of ropes, it is incorporated into strands or cores or other elements and such elements may be either solid on piece structures or they may be made up of a number of separate elements. The filaments, strands or cores comprise a plastic or a combination of plastics having the inorganic fibres embedded therein and oriented to extend in the direction of the length of the strands or cores.

Thus, in such a construction the glass or quartz fibres to as large an extent as possible or as is feasible, are oriented and also each fibre coated with a plastic so that the fibres are maintained from contact with one another. The fibres may be oriented in the filaments, strands or cores by repeated reductions as through dies or by stretching of the plastic material after incorporation of the fibres therein. The presence of these oriented fibres very greatly increases the tensile strength of the filaments or cores and thus of the ropes into which they may be incorporated.

Bentonite, in especially pure form may be mixed with water to form a gel. The gel is evaporated and the particles draw toward one another and become permanently fixed, by their attraction for one another, in strings or tiny fibrils. These mat together to form a tough coherent film. The bentonite may be extruded in the form of filaments or after being formed into sheets may be cut into strips and the latter twisted into filaments, such filaments to be used as above in the formation of strands or cores. Stretching of these gels produces orientation desirable for strength.

Under the general heading of asbestos, I include the fibrous varieties of the mineral amphibole, the fibrous forms of pyroxene, the mineral crocidolite of the amphibole group and also chrysotile. The principal varieties of asbestos are anthopyllite, amphibole and serpentine. Asbestos floats of any variety may be used as fillers while the longer fibres may be made into filaments for strands or cores.

Various combinations of the material disclosed may be used for the purpose of regulating resiliency, stiffness, bacteria growth, fungus growth, water-proofness, controlling the melting or softening point, control of strength factors, as elasticity, tensile, abrasive and shear strength, aiding in lubrication and the like. Many of the materials disclosed herein and which are chemically incompatible with one another are mechanically miscible to form a homogeneous mass adapted to be fabricated into filaments or bars, sheets and strips to be made into ropes, or cores meeting any of the above requirements as to combinations of physical and chemical characteristics. Thus materials which may not be used alone for my purposes by reason of being too brittle and the like may be mixed with other materials and in that way utilized for the characteristics they may impart.

Formaldehyde and urea resins as well as any chlorinated material (certain synthetic lastics), and the like have germicidal properties and when used with other materials included herein will serve to prevent or arrest bacteria growth and thus decomposition of the filaments or cores due to the action of bacteria or fungus. Whether the action of said materials merely arrests bacteria growth or completely eliminates bacteria will depend on the materials and the quantities used in the mixtures.

In fact some of the organic plastics may be used with clay or other cheap fillers as well as with fillers of cotton, silk, wool, waste ends from rope making, or other fibrous materials both natural and synthetic. Thus cotton, silk, wool, rayon and other regenerated celluloses, or other fibrous material may be used in the form of flock, stable fibres, threads, swatches of woven fabrics or impregnated sheets cut to strips for twisting into elements or strands. In addition cellulose derivatives while in alpha and beta stage may be used as fillers and to toughen the material.

The various filaments (whether bundles of fine filaments or single bar-like elements of considerable diameter are employed) are oriented. Where preformed structures are employed it is preferred that the molecules of the filaments be oriented in a direction parallel to the axial centers of the filaments. That is, the molecules are oriented in a direction parallel to the center of a helical line (the longitudinal center line of the filaments) rather than the parallel relation to a straight line. This is accomplished by stretching the material through a helical die. Thus in my preformed strands or filaments I avoid obstinate internal stresses, which cause a wildness of fibre. The strands, cores or ropes made of the filaments oriented as described will have increased tensile strength and extra resistance to twisting and bending, and will lay in a rope without opposing stresses tending to open the rope.

In orienting the filaments (whether thread-like or bar-like) they are reduced to the desired diameters by repeated small reductions obtained by drawing through successively smaller dies or by repeated stretching. Such reductions take place while the material is in a ductile condition. The preforming and orienting operations may be simultaneously accomplished.

In making the filaments of twisted strips rather than by extrusion the sheets from which the strips are to be taken are reduced to the desired thickness by repeated small reductions rather than by a single large reduction. These reductions take place while the material is heated or wetted (depending on the material being used). The finishing sheets are cut to strips and the latter twisted into filaments for use in cores or the like.

Preferably the strips are cut from the sheet in such manner as to have the direction of the length of the flow of the material of the sheet represent the longitudinal axis of the strips. Thereafter as the strips are twisted they are heated or wetted (depending on the material concerned) and are stretched whereby to further orient the molecules to have the latter oriented in the direction of the length of the twisted strip and on a bias with respect to that which was the longitudinal axis of the strip prior to the twisting thereof.

According to the invention a suitable luminous material, as phosphorescent, fluorescent or radio active substance, is mixed with the plastic while in powdered form or at any other point in the rope making process prior to the extrusion or rolling of the plastic into filaments, coatings, or the like elements or parts. Thus the luminous material is distributed throughout the mass of the plastic and when the filaments or the like are formed the luminous material is distributed all through the filament or the like and is not merely on the surface thereof to be readily scratched or abraded therefrom during initial use of a rope fabricated from such filaments.

In Fig. 1 a rope made as above described is generally designated 10 and the same is shown as made up of a plurality of strands 11 each comprising a number of filaments 12 twisted together. Fig. 2 is somewhat stippled in addition to being cross-hatched. The cross-hatching indicates a plastic material while the stippling is to indicate the luminous material distributed throughout the filament.

It will be understood that the luminous material being distributed throughout the mass of the plastic material it is not necessary to the present invention that the filaments or rope elements be formed by the process of extrusion. The compound of the plastic and the luminous material may be rolled out into sheets, strips cut from the sheet and the strips then twisted into filaments 14 as shown in Fig. 5. The filaments thus formed of the twisted strips would have luminous properties as would the filaments formed by the extrusion process.

The filaments formed by either of the above or in fact by any other process are gathered into bundles to form rope strands and the latter are twisted or laid together either about a core or otherwise, depending on the particular rope being made. When the plastic used in making the filaments is clear or transparent it will be understood that the luminous properties of the embedded material are effective for the present purpose even though none of the material be actually at the surface of the rope.

In addition to the above constructions and processes the luminous material may be applied to the rope in the form of an adhering coating over the entire rope. However, preferably when the material is used as a coating it is applied to the individual rope filaments or at least to the bundles comprising the rope strands rather than to the entire rope whereby to better withstand abrasion. The really preferred construction is that in which the luminous material has been worked into or embedded in the plastic material of the rope (whether in solid filaments or in plastic coverings for glass or quartz fibres) whereby should the outer surface of the rope filaments be worn off or away new luminous material will be effective and the rope or cable will retain its luminous properties.

According to another modification of the invention the luminous material is applied to ropes or rope strands or elements of hemp, cotton or other natural fibres. In such instance the luminous material will be used to impregnate the strands or the entire rope of natural fibres whereby to have the luminous material work to the surfaces of such strands or rope under working conditions of the latter so that as exposed luminous material is worn away during use of the rope new luminous material will work to the surface thereof.

When a luminous coating 15 (see Fig. 3) is on the surface of a rop or strand or element 16 such coating is preferably covered with and protected by an applied continuous film or coating 17 of a tough transparent plastic. Alternatively the luminous material may be mixed with a plastic and the mixture used as a coating or covering 18 (See Fig. 4) for the rope 19 of natural fibres or of synthetic plastic.

Certain luminous materials may be incorporated in or applied to the rope filaments to have them respond to definite light waves in the ultra-violet and infra red range. In fact minerals with narrow wave bands or critical flash reactions to definite light wave lengths may be incorporated in or applied to rope filaments for the indicated purpose. Ropes with the described filaments could, for example, be used on a ship and when invisible light rays of definite range are flashed on the ship it would be identified if the rope (in rigging, etc.) became illuminated.

Having thus set forth the nature of my invention, what I claim is:

1. A rope for use about excavations, as a tow rope, for highway fences and the like comprising an elongated body, a coating on at least portions of said body and including a luminous, such as a phosphorescent, material whereby the elongated body is self-illuminating and visible in the dark, and a coating of a tough flexible, elastic and at least translucent plastic over such coating including luminous material whereby to protect the same from moisture and abrasion.

2. A rope for use about excavations, as a tow rope, for highway fences and the like comprising an elongated body, a coating on at least portions of said body, said coating comprising a mixture of a flexible elastic plastic material and a luminous material, said luminous material such as a phosphorescent material whereby the elongated body is self-illuminating and visible in the dark, and said plastic comprising a protector for said luminous material and a vehicle for securing the latter to said elongated body.

RICHARD F. WARREN, Jr.